US011556924B2

(12) United States Patent
Feng et al.

(10) Patent No.: US 11,556,924 B2
(45) Date of Patent: Jan. 17, 2023

(54) BLOCKCHAIN-BASED PAYMENT WITHHOLDING AND AGREEMENT SIGNING METHOD, APPARATUS, AND ELECTRONIC DEVICE

(71) Applicant: Advanced New Technologies Co., Ltd., Grand Cayman (KY)

(72) Inventors: Zhaolin Feng, Hangzhou (CN); Xu Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 46 days.

(21) Appl. No.: 16/802,905

(22) Filed: Feb. 27, 2020

(65) Prior Publication Data

US 2020/0193428 A1 Jun. 18, 2020

Related U.S. Application Data

(63) Continuation of application No. PCT/CN2020/072020, filed on Jan. 14, 2020.

(30) Foreign Application Priority Data

Apr. 29, 2019 (CN) .......................... 201910356838.7

(51) Int. Cl.
*G06Q 20/38* (2012.01)
*G06Q 20/08* (2012.01)
(Continued)

(52) U.S. Cl.
CPC ..... *G06Q 20/3825* (2013.01); *G06Q 20/0855* (2013.01); *G06Q 20/407* (2013.01);
(Continued)

(58) Field of Classification Search
CPC ................................................. G06Q 20/3825
See application file for complete search history.

(56) References Cited

U.S. PATENT DOCUMENTS 6,865,559 B2 * 3/2005 Dutta ..................... G06Q 20/02
705/318
2002/0087469 A1 * 7/2002 Ganesan .............. G06Q 20/102
705/40

(Continued)

FOREIGN PATENT DOCUMENTS

CN 105809062 7/2016
CN 107103473 8/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — John W Hayes
*Assistant Examiner* — Zehra Raza
(74) *Attorney, Agent, or Firm* — Fish & Richardson P.C.

(57) ABSTRACT

Computer-implemented methods, non-transitory, computer-readable media, and computer-implemented systems for blockchain-based payment withholding and agreement signing are described. In one computer-implemented method, an agreement signing transaction submitted by a user is received and used to authorize a payment system to provide a payment withholding service for a payment order of the user in a third-party service system. The agreement signing transaction includes agreement signing information of a tripartite agreement submitted by the user. Withholding verification logic declared in a first smart contract published on the blockchain is invoked to check whether there is a withholding agreement signed between the payment system and the third-party service system on the blockchain. If yes, the tripartite agreement is created that authorizes the payment system to provide the payment withholding service for (Continued)

the payment order for the user and published to the blockchain for certificate storage.

20 Claims, 10 Drawing Sheets

(51) Int. Cl.
    *G06Q 20/40*     (2012.01)
    *H04L 9/06*     (2006.01)
    *H04L 9/32*     (2006.01)
    *H04L 9/00*     (2022.01)

(52) U.S. Cl.
    CPC .......... *H04L 9/0643* (2013.01); *H04L 9/3247* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 2010/0106651 | A1* | 4/2010 | Tate | G06Q 50/188 705/80 |
| 2016/0260171 | A1* | 9/2016 | Ford | G06Q 40/04 |
| 2018/0123779 | A1 | 5/2018 | Zhang | |
| 2019/0081789 | A1* | 3/2019 | Madisetti | G06Q 20/401 |
| 2019/0392536 | A1* | 12/2019 | Rice | H04L 67/22 |
| 2020/0073699 | A1* | 3/2020 | Zhu | G06F 16/2379 |

FOREIGN PATENT DOCUMENTS

| | | |
|---|---|---|
| CN | 107341702 | 11/2017 |
| CN | 107423565 | 12/2017 |
| CN | 108256859 | 7/2018 |
| CN | 108647523 | 10/2018 |
| CN | 109064113 | 12/2018 |
| CN | 109347941 | 2/2019 |
| CN | 110147990 | 8/2019 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln. No. PCT/CN2020/072020, dated Apr. 13, 2020, 10 pages (full machine translation).

\* cited by examiner

BLOCKCHAIN-BASED PAYMENT WITHHOLDING AND AGREEMENT SIGNING METHOD, APPARATUS, AND ELECTRONIC DEVICE

CROSS-REFERENCE TO RELATED APPLICATIONS

This application is a continuation of PCT Application No. PCT/CN2020/072020, filed on Jan. 14, 2020, which claims priority to Chinese Patent Application No. 201910356838.7, filed on Apr. 29, 2019, and each application is hereby incorporated by reference in its entirety.

TECHNICAL FIELD

One or more implementations of the present specification relate to the field of blockchain technologies, and in particular, to blockchain-based payment withholding and agreement signing methods, apparatuses, and electronic devices.

BACKGROUND

The blockchain technology, also referred to as a distributed ledger technology, is an emerging technology in which several computing devices jointly participate in "accounting" and jointly maintain a complete distributed database. Due to its features of decentralization, openness and transparency, participation in database recording by each computing device, and fast data synchronization between computing devices, the blockchain technology has been widely used in many fields.

SUMMARY

In view of the previous description, one or more implementations of the present specification provide blockchain-based payment withholding and agreement signing methods, apparatuses, electronic devices, and storage media.

To achieve the previous objective, one or more implementations of the present specification provide the following technical solutions:

According to a first aspect of one or more implementations of the present specification, a blockchain-based payment withholding and agreement signing method is provided, where the method is applied to a blockchain node, and includes the following: receiving an agreement signing transaction submitted by a user, where the agreement signing transaction is used to authorize a payment system to provide a payment withholding service for the user for a payment order, the payment order is a payment order of the user in a third-party service system, and the agreement signing transaction includes agreement signing information of a tripartite agreement submitted by the user; in response to the agreement signing transaction, invoking withholding verification logic declared in a first smart contract published on the blockchain, to check whether there is a withholding agreement signed between the payment system and the third-party service system on the blockchain; and if yes, creating, based on the signing information of the tripartite agreement, the tripartite agreement that authorizes the payment system to provide the payment withholding service for the payment order for the user, and publishing the tripartite agreement to the blockchain for certificate storage where data published to the blockchain is stored in the blockchain, creating an immutable record to be verified later.

Optionally, the checking whether there is a withholding agreement signed between the payment system and the third-party service system on the blockchain includes the following: checking whether there is the withholding agreement on the blockchain; and if yes, further checking whether the withholding agreement is valid.

Optionally, the creating, based on the signing information of the tripartite agreement, the tripartite agreement that authorizes the payment system to provide the payment withholding service for the payment order for the user, and publishing the tripartite agreement to the blockchain for certificate storage includes the following: creating the tripartite agreement based on the signing information of the tripartite agreement; publishing the tripartite agreement to the blockchain for certificate storage; and creating a second smart contract associated with the tripartite agreement and publishing the second smart contract to the blockchain, where the second smart contract declares tripartite verification logic that is used to verify the tripartite agreement corresponding to the user.

Optionally, the method further includes the following: receiving a withholding transaction from the payment system connected to the blockchain, where the withholding transaction includes withholding information of the user's payment order in the third-party service system; in response to the withholding transaction, invoking criterion verification logic declared in the first smart contract, to verify whether the withholding information satisfies a withholding criterion set forth in the withholding agreement; and if yes, further invoking the tripartite verification logic declared in the second smart contract, to check whether there is the tripartite agreement corresponding to the user, so that the payment system performs deduction processing for the user based on the withholding information when an obtained verification result indicates that the verification succeeds.

Optionally, the method further includes the following: marking the tripartite agreement as an effective state based on an effective time described in the tripartite agreement after the tripartite agreement is created; and the further invoking the tripartite verification logic declared in the second smart contract, to check whether there is the tripartite agreement corresponding to the user includes the following: checking whether there is the tripartite agreement; and if yes, further checking whether the tripartite agreement is in the effective state.

Optionally, the method further includes the following: receiving a modification transaction submitted by the user, where the modification transaction includes modification information for the tripartite agreement corresponding to the user; creating an updated tripartite agreement based on the modification information in response to the modification transaction; and creating a third smart contract associated with the updated tripartite agreement and publishing the third smart contract to the blockchain, where the third smart contract declares tripartite verification logic that is used to verify the updated tripartite agreement corresponding to the user.

Optionally, the method further includes the following: receiving an agreement cancellation transaction submitted by the user, where the agreement cancellation transaction includes agreement cancellation information for the tripartite agreement corresponding to the user; and marking the tripartite agreement corresponding to the user as an ineffective state in response to the agreement cancellation transaction.

According to a second aspect of one or more implementations of the present specification, a blockchain-based payment withholding and agreement signing apparatus is provided, where the apparatus is applied to a blockchain node, and includes the following: an agreement signing receiving unit, configured to receive an agreement signing transaction submitted by a user, where the agreement signing transaction is used to authorize a payment system to provide a payment withholding service for the user for a payment order, the payment order is a payment order of the user in a third-party service system, and the agreement signing transaction includes agreement signing information of a tripartite agreement submitted by the user; a withholding verification unit, configured to: in response to the agreement signing transaction, invoke withholding verification logic declared in a first smart contract published on the blockchain, to check whether there is a withholding agreement signed between the payment system and the third-party service system on the blockchain; and a creation unit, configured to: if there is a withholding agreement signed between the payment system and the third-party service system on the blockchain, create, based on the signing information of the tripartite agreement, the tripartite agreement that authorizes the payment system to provide the payment withholding service for the payment order for the user, and publish the tripartite agreement to the blockchain for certificate storage.

Optionally, the withholding verification unit is configured to: check whether there is the withholding agreement on the blockchain; and if yes, further check whether the withholding agreement is valid.

Optionally, the creation unit is configured to: create the tripartite agreement based on the signing information of the tripartite agreement; publish the tripartite agreement to the blockchain for certificate storage; and create a second smart contract associated with the tripartite agreement and publish the second smart contract to the blockchain, where the second smart contract declares tripartite verification logic that is used to verify the tripartite agreement corresponding to the user.

Optionally, the apparatus further includes the following: a withholding receiving unit, configured to receive a withholding transaction from the payment system connected to the blockchain, where the withholding transaction includes withholding information of the user's payment order in the third-party service system; a condition verification unit, configured to: in response to the withholding transaction, invoke criterion verification logic declared in the first smart contract, to verify whether the withholding information satisfies a withholding criterion set forth in the withholding agreement; and a tripartite verification unit, configured to: if the withholding information satisfies the withholding criterion set forth in the withholding agreement, further invoke the tripartite verification logic declared in the second smart contract, to check whether there is the tripartite agreement corresponding to the user, so that the payment system performs deduction processing for the user based on the withholding information when an obtained verification result indicates that the verification succeeds.

Optionally, the apparatus further includes the following: an effectiveness marking unit, configured to mark the tripartite agreement as an effective state based on an effective time described in the tripartite agreement after the tripartite agreement is created; and the tripartite verification unit is configured to: check whether there is the tripartite agreement; and if yes, further check whether the tripartite agreement is in the effective state.

Optionally, the apparatus further includes the following: a modification receiving unit, configured to receive a modification transaction submitted by the user, where the modification transaction includes modification information for the tripartite agreement corresponding to the user; and an update unit, configured to: create an updated tripartite agreement based on the modification information in response to the modification transaction, create a third smart contract associated with the updated tripartite agreement, and publish the third smart contract to the blockchain, where the third smart contract declares tripartite verification logic that is used to verify the updated tripartite agreement corresponding to the user.

Optionally, the apparatus further includes the following: an agreement cancellation receiving unit, configured to receive an agreement cancellation transaction submitted by the user, where the agreement cancellation transaction includes agreement cancellation information for the tripartite agreement corresponding to the user; and an ineffectiveness marking unit, configured to mark the tripartite agreement corresponding to the user as an ineffective state in response to the agreement cancellation transaction.

According to a third aspect of one or more implementations of the present specification, an electronic device is provided, including the following: a processor; and a memory, configured to store a processor executable instruction, where the processor runs the executable instruction to implement the blockchain-based payment withholding and agreement signing method according to any implementation previously described.

According to a fourth aspect of implementations of the present disclosure, a computer readable storage medium is provided, where the computer readable storage medium stores a computer instruction, and the instruction is executed by a processor to implement the steps of blockchain-based payment withholding and agreement signing according to any implementation previously described.

As can be seen from the previous technical solutions, according to the payment withholding and agreement signing solution in the present specification, the tripartite agreement is signed among the user, the third-party service system, and the payment system based on the blockchain. By signing the tripartite agreement, the user can authorize the payment system to take the place of the third-party service system to deduct money for the user. On the one hand, the created tripartite agreement is published to the blockchain for certificate storage, so that signing information of the tripartite agreement is traceable, anti-counterfeiting, and tamper-resistant. On the other hand, by invoking the smart contract to verify the withholding agreement signed between the payment system and the third-party service system before the tripartite agreement is signed, the authorization operation of the user can be performed under the precondition that the payment system is capable of replacing the third-party service system to perform deduction.

Further, based on the signed tripartite agreement, when there is a payment order between the third-party service system and the user, the third-party service system can publish a withholding request on the blockchain for certificate storage. After detecting the withholding request, the payment system can construct a withholding transaction to invoke a smart contract to verify whether the withholding is legal based on the previous withholding agreement and tripartite agreement. Then, when the withholding is legal, the payment system performs deduction processing for the user, so as to implement the payment withholding service.

DESCRIPTION OF IMPLEMENTATIONS

Figure 1:
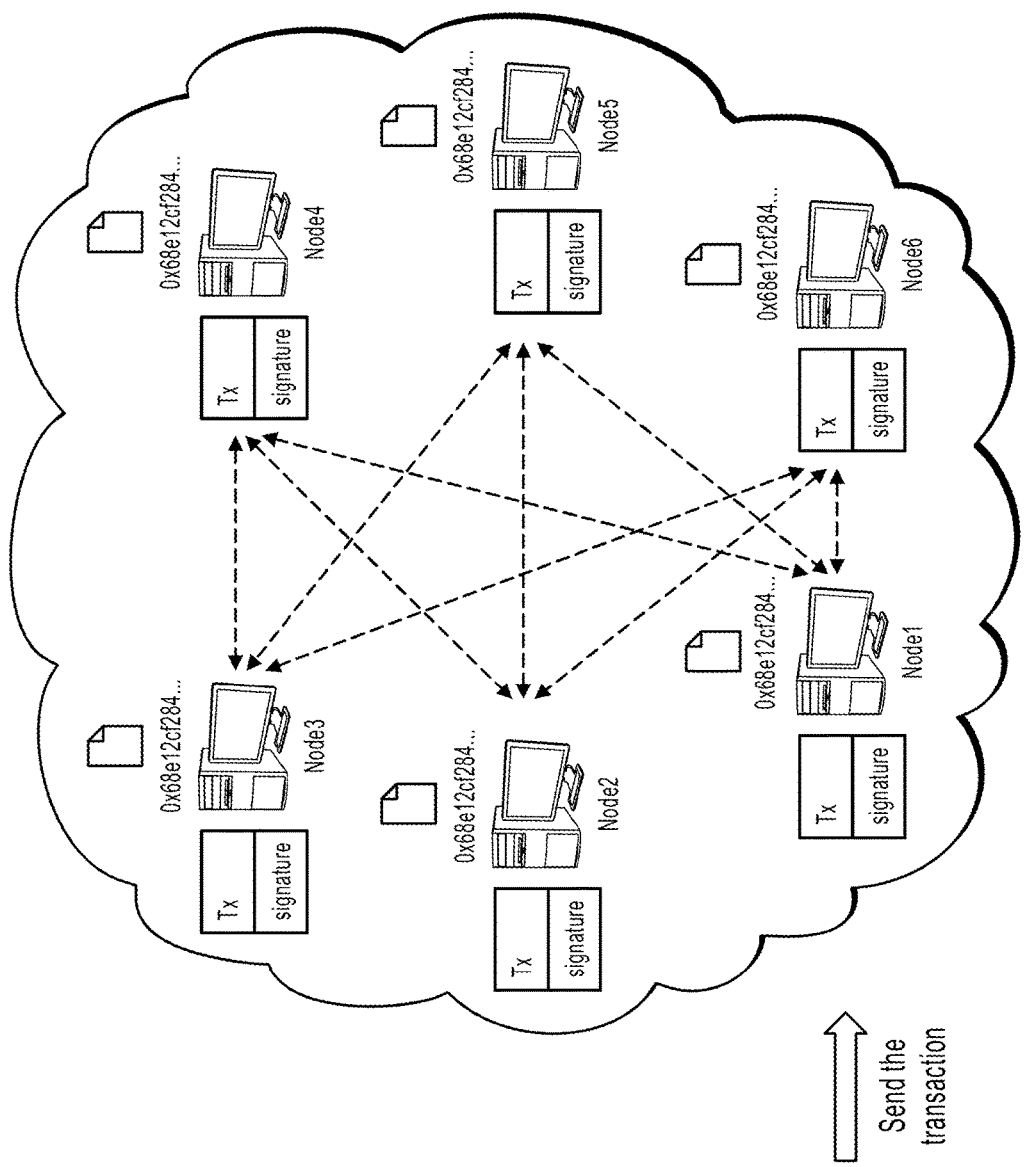
FIG. 1 is a schematic diagram of creating a smart contract, according to an example implementation.
Figure 1:
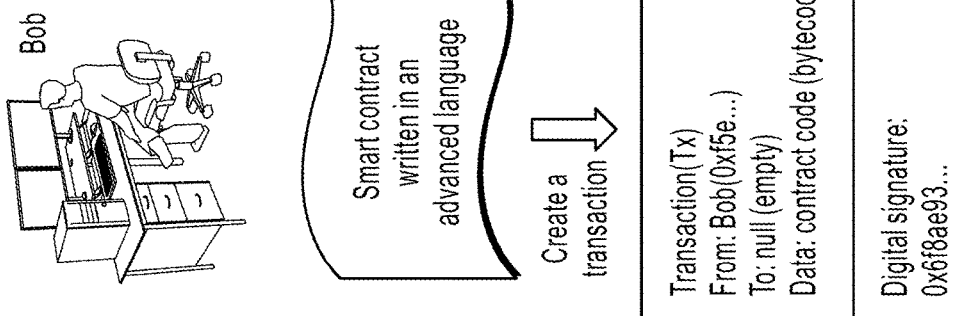

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that the steps of the corresponding method are not necessarily performed in the order shown and described in the present specification in other implementations. In some other implementations, the method can include more or less steps than those described in the present specification. In addition, a single step described in the present specification can be decomposed into multiple steps in other implementations for description; and multiple steps described in the present specification can be combined into a single step for description in other implementations.

Blockchains are generally classified into three types: public blockchain, private blockchain, and consortium blockchain. In addition, there are multiple types of combinations, such as private blockchain+consortium blockchain, consortium blockchain+public blockchain, etc. The public blockchain has the highest degree of decentralization. The public blockchain is represented by bitcoins and Ethereum. Participants joining the public blockchain can read data records on the blockchain, participate in transactions, and contend for the accounting right in new blocks.

Furthermore, participants (namely, nodes) can join or exit the network freely and perform related operations. On the contrary, in the private blockchain, write permissions of the network are controlled by a certain organization or institution, and the data read permissions are specified by the organization. In short, the private blockchain can be a weakly-centralized system. Participants have strict restrictions and the number of participates is small. Such type of blockchain is more suitable for use within a particular institution.

The consortium blockchain is a blockchain between the public blockchain and the private blockchain, and can implement "partial decentralization". Each node in the consortium blockchain usually has its corresponding physical institution or organization. Participants join the network through authorization and form a stakeholder consortium to jointly maintain blockchain operation.

Each of the public blockchain, the private blockchain, and the consortium blockchain can provide a function of a smart contract. A smart contract on the blockchain is a contract that can be triggered and executed by a transaction in a blockchain system. Smart contracts can be defined in the form of code.

Ethereum is used as an example. Ethereum supports users in creating and invoking some complex logic in an Ethereum network. It is the biggest challenge that distinguishes Ethereum from the bitcoin blockchain technology. As a programmable blockchain, the core of Ethereum is an Ethereum virtual machine (EVM). Each Ethereum node can run the EVM. The EVM is a Turing-complete virtual machine, meaning that various complex logics can be implemented by using the EVM. The user publishes and invokes a smart contract in the Ethereum by running the EVM. In fact, the virtual machine directly runs virtual machine code (virtual machine bytecode, which is briefly referred to "bytecode" in the following). A smart contract deployed on the blockchain can be in the form of a bytecode.

As shown in FIG. 1, after Bob sends a transaction that includes information for creating a smart contract to an Ethereum network, an EVM of node 1 can execute the transaction and generate a corresponding contract instance. In FIG. 1, "0x68e12cf284 . . . " represents an address of the contract, the data field of the transaction can store a bytecode and the to field of the transaction is an empty account. After consensus is reached between nodes by using the consensus mechanism, the contract is successfully created and can be invoked later by users.

After the contract is created, a contract account corresponding to the smart contract appears on the blockchain and has a specific address. Contract code and account storage will be saved in the contract account. Behavior of the smart contract is controlled by the contract code, whereas the account storage of the smart contract retains a status of the contract. In other words, the smart contract causes a virtual account that includes the contract code and the account storage to be generated on the blockchain.

As previously described, the data field of the transaction that includes the information for creating the smart contract can store the bytecode of the smart contract. The bytecode consists of a series of bytes, and each byte can identify one operation. Based on considerations of development efficiency, readability, etc., developers can select an advanced language to write the smart contract code instead of directly writing the bytecode. For example, advanced languages such as Solidity, Serpent, and LLL are used. The smart contract code written in an advanced language can be compiled by a compiler to generate a bytecode that can be deployed on the blockchain.

The Solidity language is used as an example. The contract written in the Solidity language is similar to a class in the object-oriented programming language. Multiple members can be declared in a contract, including a state variable, a function, a function modifier, an event, etc. The state variable is a value that is permanently stored in the account storage of the smart contract, and is used to save the status of the contract.

Generally, after a smart contract is deployed on the blockchain, a storage state corresponding to the state variable in the contract code of the smart contract is a plaintext, and its state is visible to any person, without setting and capability of privacy protection.

Figure 2:
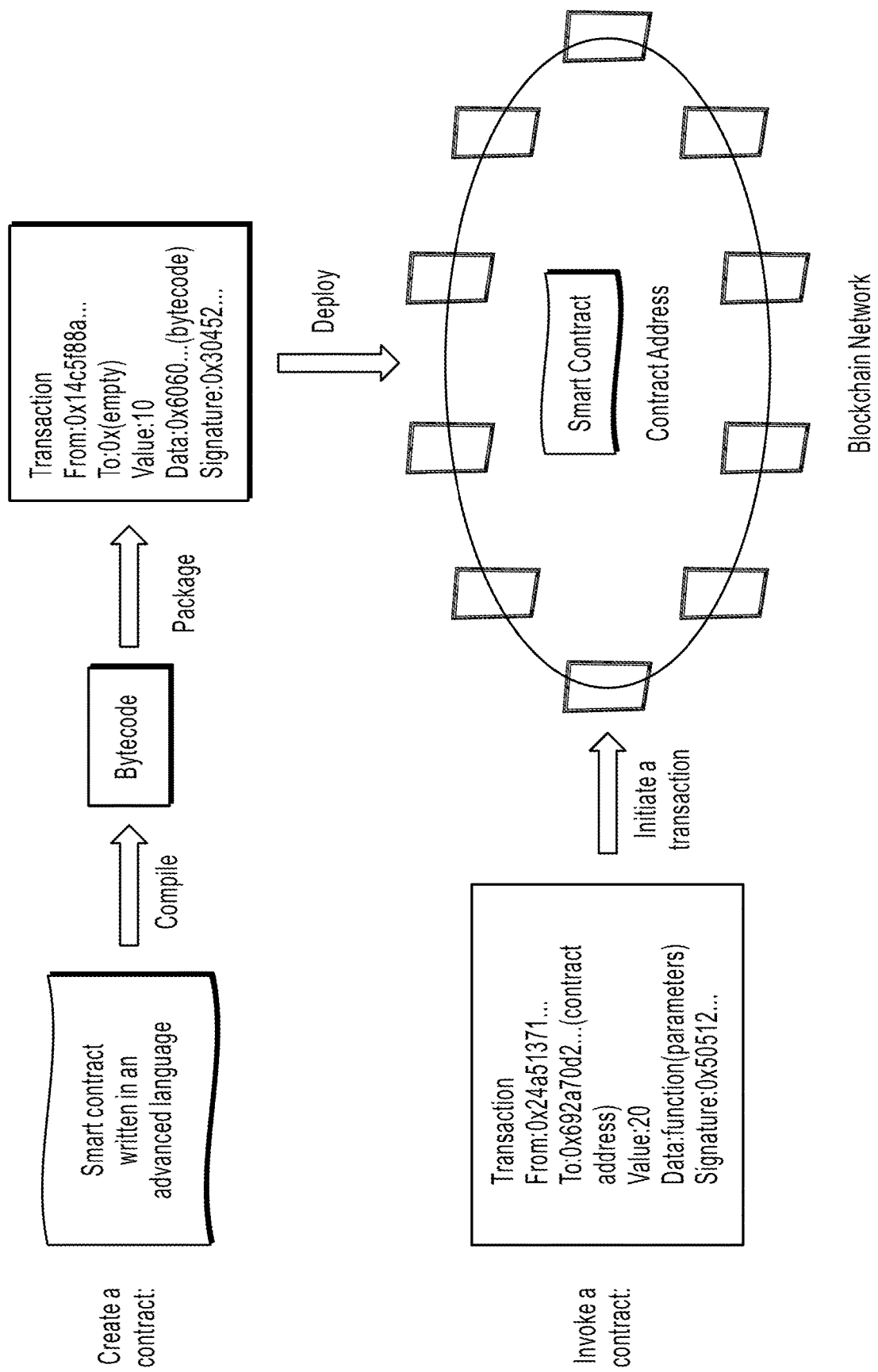
FIG. 2 is a schematic diagram of invoking a smart contract, according to an example implementation.

As shown in FIG. 2, Ethereum is still used as an example. After Bob sends a transaction that includes information for invoking a smart contract to the Ethereum network, the EVM of node 1 can execute the transaction and generate a corresponding contract instance. In FIG. 2, the from field of the transaction represents an address of an account that initiates the invoking of the smart contract; "0x692a70d2 . . ." in the to field represents an address of the invoked smart contract; the value field represents a value of an Ethercoin in Ethereum; and the data field of the transaction stores a method and parameter for invoking the smart contract. After the smart contract is invoked, a value of balance may change. Later, a certain client can view the current value of balance by using a certain blockchain node (such as node 6 in FIG. 2).

The smart contract can be executed independently on each node in the blockchain network in a specified way, and all execution records and data are stored on the blockchain. Therefore, after such transaction is completed, the blockchain stores a transaction credential that cannot be tampered with and will not be lost.

Figure 3:
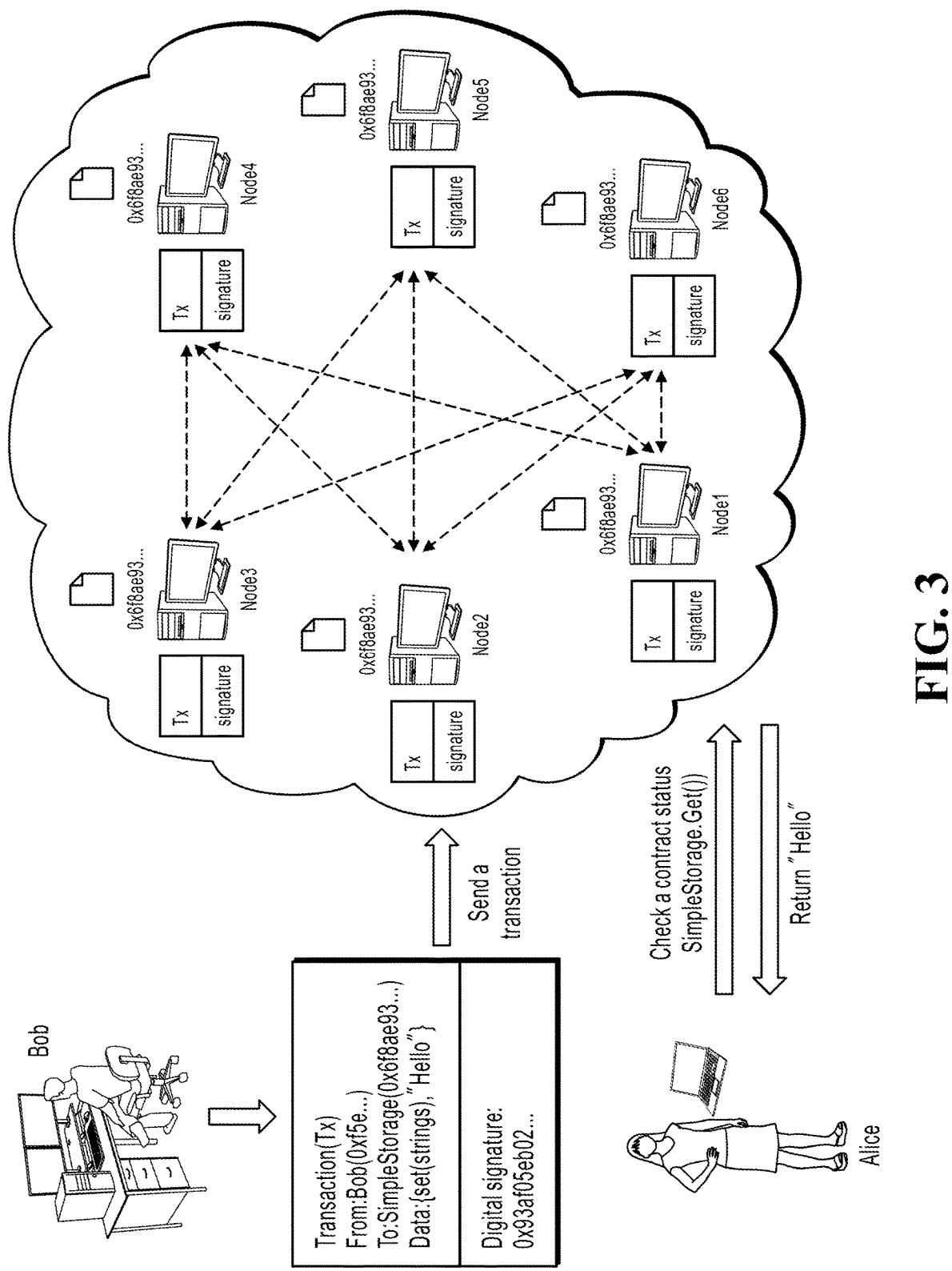
FIG. 3 is a schematic diagram of creating a smart contract and invoking a smart contract, according to an example implementation.

FIG. 3 is a schematic diagram of creating a smart contract and invoking a smart contract. Creating a smart contract in Ethereum includes processes such as writing a smart contract, converting the smart contract into a bytecode, deploying the bytecode to the blockchain, etc. Invoking a smart contract in Ethereum is to initiate a transaction that points to the address of the smart contract. The code of the smart contract is executed in the virtual machine of each node in the Ethereum network in a distributed way.

Figure 4:
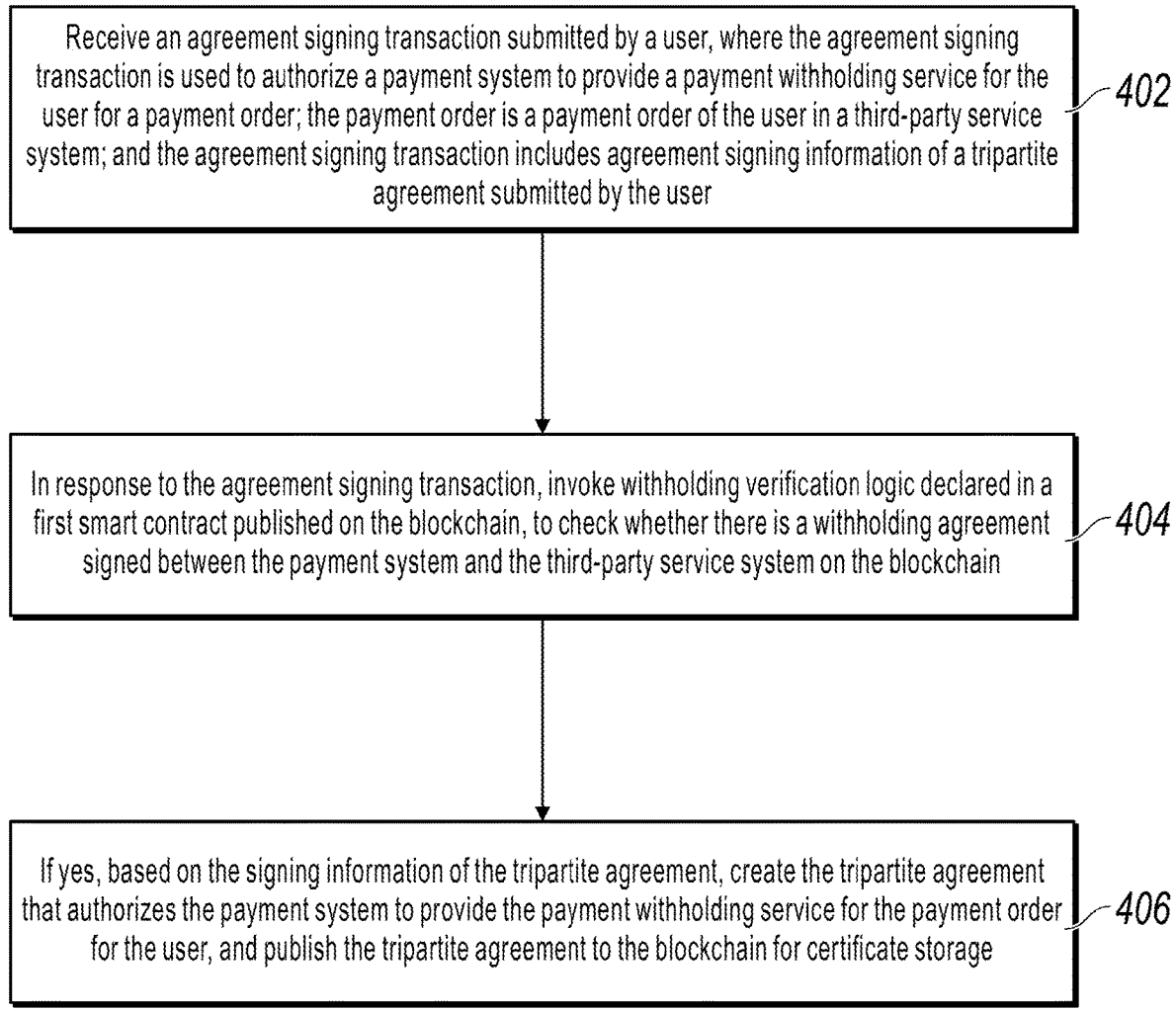
FIG. 4 is a flowchart illustrating a blockchain-based payment withholding and agreement signing method, according to an example implementation.

FIG. 4 is a flowchart illustrating a blockchain-based payment withholding and agreement signing method, according to an example implementation. As shown in FIG. 4, the method is applied to a blockchain node and can include the following steps.

Step 402: Receive an agreement signing transaction submitted by a user, where the agreement signing transaction is used to authorize a payment system to provide a payment withholding service for the user for a payment order; the payment order is a payment order of the user in a third-party service system; and the agreement signing transaction includes agreement signing information of a tripartite agreement submitted by the user.

In the present implementation, the user can initiate agreement signing at an agreement signing page portal that is provided by an independent software vendor (ISV), or at an agreement signing page portal that is provided by another client connected to a blockchain node. The user fills in the signing information of the tripartite agreement on the agreement signing page, including a service type, an account number, an account name, effective time, etc. The ISV (or another client) then constructs the agreement signing transaction based on the signing information of the tripartite agreement.

Step 404: In response to the agreement signing transaction, invoke withholding verification logic declared in a first smart contract published on the blockchain, to check whether there is a withholding agreement signed between the payment system and the third-party service system on the blockchain.

In the present implementation, the withholding agreement can be formulated in advance between the payment system and the third-party service system. For example, both parties can negotiate offline about a specific withholding rule and a withholding criterion of the withholding agreement. The withholding criterion can include at least one of the following: a withholding amount is within a predetermined amount range; the number of withholding times is within a predetermined range of times; a withholding time point is within a predetermined time range; and so on. Further, after the specific content of the withholding agreement is determined through negotiation, the third-party service system (or the payment system) can publish the withholding agreement to the blockchain for certificate storage, and deploy the first smart contract associated with the withholding agreement on the blockchain.

In an example implementation, the previous blockchain can be a consortium blockchain whose members include the third-party service system and the payment system. In such case, the first smart contract can declare withholding verification logic that is used to check whether there is the withholding agreement signed between the payment system and the third-party service system on the blockchain. After the development of the first smart contract is completed, the third-party service system (or the payment system) can publish the smart contract to the consortium blockchain by using any node device on the consortium blockchain, and store the smart contract in a distributed database (i.e., a distributed ledger) of the consortium blockchain after the smart contract is agreed upon by some designated member node devices on the consortium blockchain (e.g., some authoritative node devices having the accounting right specified on the consortium blockchain). Later, the user can access a client of any node device and submit a transaction to the smart contract stored on the blockchain, to initiate invoking of the smart contract and trigger execution of related service logic on the consortium blockchain. The consensus algorithm used by the member node devices on the consortium blockchain to perform consensus processing on the smart contract that is published to the blockchain, and the specific consensus process are not described in detail in the present specification. A person skilled in the art can refer to the description in the related technology when implementing the technical solution described in the present specification.

For example, after receiving the agreement signing transaction, the blockchain node can invoke the withholding verification logic declared in the first smart contract that is published on the blockchain, to check whether a withholding agreement corresponding to a hash value recorded in the agreement signing transaction is published on the blockchain for certificate storage.

In the present implementation, the status of the withholding agreement can be further maintained for the withholding agreement signed between the payment system and the third-party service system. The withholding agreement can include an effective state, a to-be-effective state, an ineffective state, etc. Whether the withholding agreement is published on the blockchain for certificate storage is checked first, and if yes, whether the withholding agreement is valid is further checked. For example, whether the withholding agreement is valid can be determined based on the effective time described in the withholding agreement.

Step 406: If yes, create, based on the signing information of the tripartite agreement, the tripartite agreement that authorizes the payment system to provide the payment withholding service for the payment order for the user, and publish the tripartite agreement to the blockchain for certificate storage.

In the present implementation, in addition to creating the tripartite agreement and publishing it to the blockchain for certificate storage, a second smart contract associated with the tripartite agreement can be further created and published to the blockchain. The second smart contract declares tripartite verification logic that is used to verify the tripartite agreement corresponding to the user. For example, the payment system or the third-party service system can predetermine a contract template for creating the second smart contract (for example, publish the contract template to the blockchain for certificate storage). The contract template records generic logic that is used to verify the tripartite agreement. Then, when a smart contract is created by using the contract template, the hash value of the created tripartite agreement can be filled in the generic logic. The filled generic logic that includes the hash value is the tripartite verification logic that is used to verify the tripartite agreement corresponding to the hash value.

In the present implementation, when developing the first smart contract, the third-party service system (or the payment system) can also declare the agreed withholding criterion in the first smart contract in the form of criterion verification logic (that is, the criterion verification logic is used to verify whether the withholding information submitted by the third-party service system satisfies the withholding criterion set forth in the withholding agreement) based on the withholding agreement between the two. Based on the previous process of publishing the first smart contract and the second smart contract, the payment system can send the corresponding withholding transaction (including the withholding information of the user's payment order in the third-party service system) to the blockchain node when the third-party service system has a payment withholding demand. After receiving the withholding transaction, the blockchain node responds to the withholding transaction and invokes the criterion verification logic declared in the first smart contract, to verify whether the withholding information satisfies the withholding criterion set forth in the withholding agreement. If yes, the blockchain node further invokes the tripartite verification logic declared in the second smart contract, to check whether there is the tripartite agreement corresponding to the user, so that the payment system performs deduction processing for the user based on the withholding information when an obtained verification result indicates that the verification succeeds.

Similarly, the status of the tripartite agreement can be further maintained for the tripartite agreement signed among the user, the payment system, and the third-party service system. For example, after the tripartite agreement is created, the tripartite agreement can be marked as the effective state based on the effective time described in the tripartite agreement. When the tripartite agreement of the user is verified, whether there is the tripartite agreement corresponding to the user can be verified first. If yes, whether the tripartite agreement is in an effective state is further verified.

In the present implementation, the user can also modify the signed tripartite agreement, for example, modify account information such as the user's account name and account number. The user can package a modification transaction (including modification information of the tripartite agreement for the user) by using the ISV or another client connected to the blockchain node, and send the modification transaction to the blockchain node. Then, after receiving the modification transaction, the blockchain node responds to the modification transaction, creates an updated tripartite agreement based on the modification information, creates a third smart contract (which declares tripartite verification logic that is used to verify the updated tripartite agreement corresponding to the user) associated with the updated tripartite agreement, and publishes the third smart contract to the blockchain.

In the present implementation, the user can also cancel the signed tripartite agreement, for example, modify the tripartite agreement (signed by the user) currently in an effective state as an ineffective state. The user can package an agreement cancellation transaction (including agreement cancellation information of the tripartite agreement for the user) by using the ISV or another client connected to the blockchain node, and send the agreement cancellation transaction to the blockchain node. Then, after receiving the agreement cancellation transaction submitted by the user, the blockchain node marks the tripartite agreement corresponding to the user as the ineffective state in response to the agreement cancellation transaction.

Figure 5:
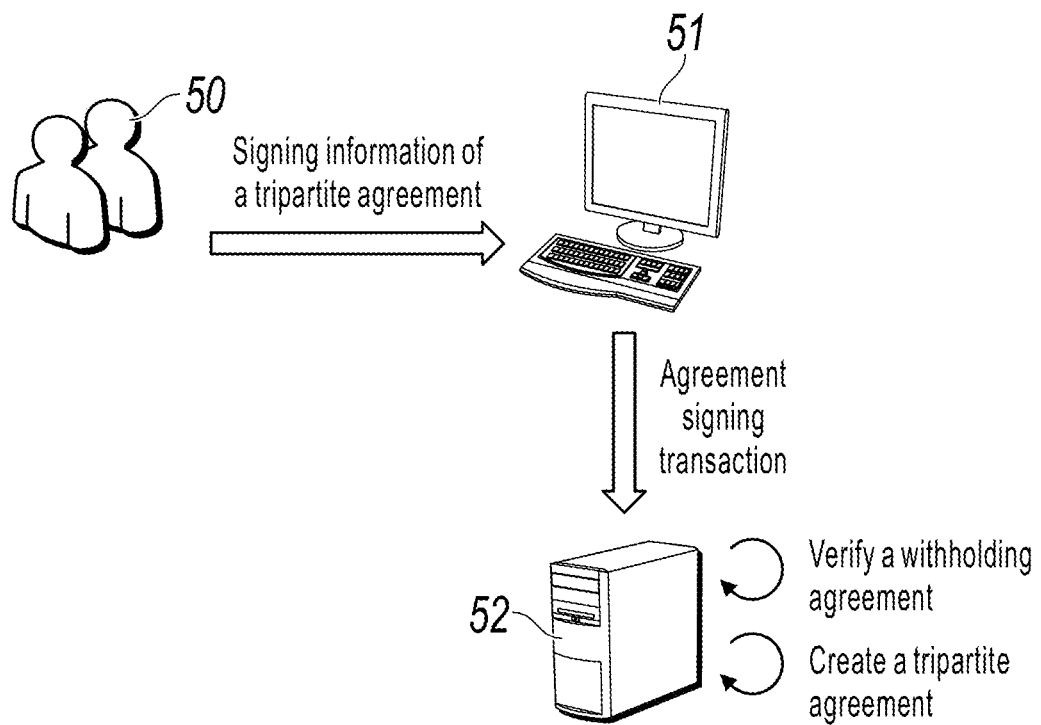
FIG. 5 is a schematic diagram illustrating an overall architecture of a blockchain-based payment withholding and agreement signing solution, according to an example implementation.

FIG. 5 is a schematic diagram illustrating an overall architecture of a blockchain-based payment withholding and agreement signing solution, according to an example implementation. As shown in FIG. 5, a user 50 can register an account with a server 52 by using a client 51 in advance to obtain a registered account uniquely corresponding to the user 50. Then, the user 50 can log in to the registered account on the client 51. Based on the login information of the registered account on the client 51, the server 52 determines that a binding relationship is established between the registered account (corresponding to the user 50) and the client 51. The binding relationship is a binding relationship between user information of the user 50 and device information of the client 51. Based on the binding relationship, when receiving an agreement signing transaction sent later by the client 51, the server 52 can determine that the agreement signing transaction corresponds to the user 50. A client of the blockchain runs on the server 52, so that the server 52 is configured as a blockchain node. The user 50 can log in to the registered account on the client 51 and fill in the signing information of the tripartite agreement, so as to send the agreement signing transaction that includes the signing information of the tripartite agreement to the server 52 by using the client 51. The server 52 (as a blockchain node) performs the previously described step of verifying the withholding agreement after receiving the agreement signing transaction, and creates the tripartite agreement based on the signing information of the tripartite agreement after the verification succeeds.

As can be seen from the previous technical solutions, the user can sign the tripartite agreement with the third-party service system and the payment system by submitting the agreement signing transaction to the blockchain node. Based on the signed tripartite agreement, when the payment order is generated for the user in the third-party service system with which the tripartite agreement is signed, the payment system can provide the payment withholding service for the payment order for the user, that is, can take the place of the third-party service system to perform deduction processing for the payment order for the user. The following describes the withholding process separately from the perspective of the blockchain node and the payment system connected to the blockchain node.

Figure 6:
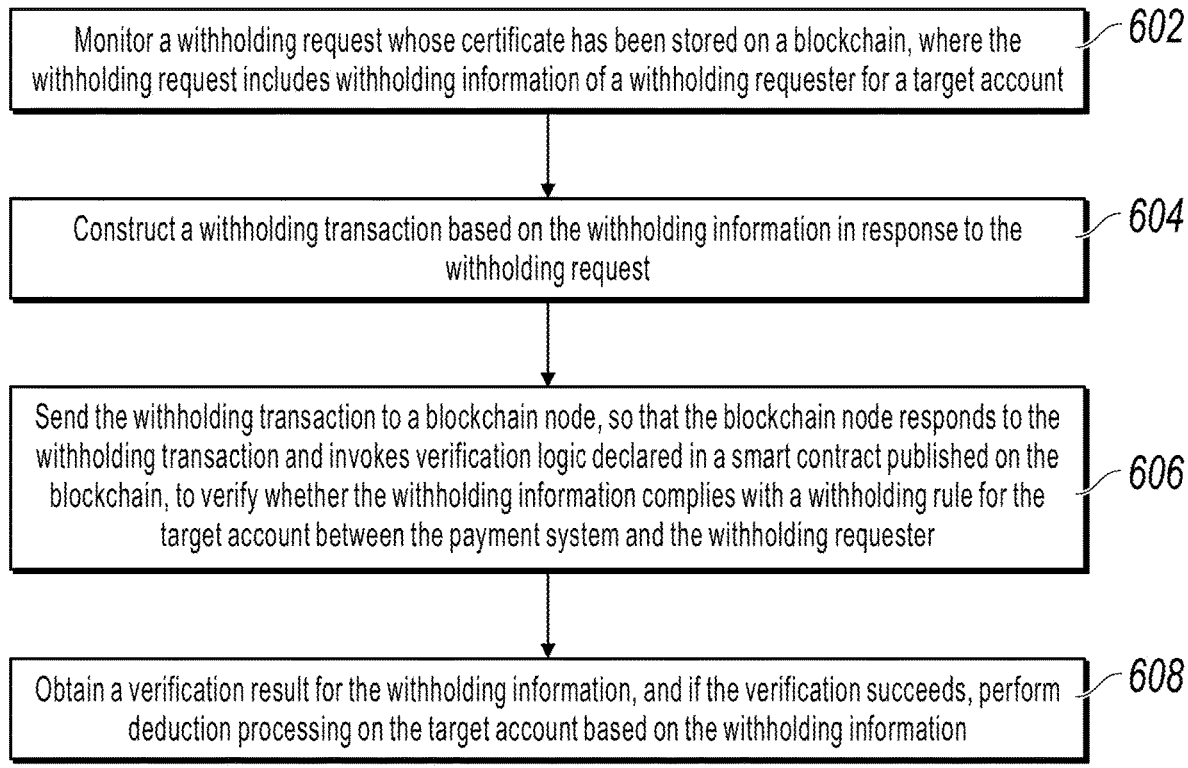
FIG. 6 is a flowchart illustrating a blockchain-based payment withholding method, according to an example implementation.

FIG. 6 is a flowchart illustrating a blockchain-based payment withholding method, according to an example implementation. As shown in FIG. 6, the method is applied to a payment system connected to the blockchain, and can include the following steps:

Step 602: Monitor a withholding request whose certificate has been stored on the blockchain, where the withholding request includes withholding information of a withholding requester for a target account.

In the present implementation, the interconnection between the payment system and the blockchain can be understood as follows: The payment system uses the blockchain as the data source, and executes related business logic based on the data whose certificate has been stored on the blockchain. When the payment order is generated between the third-party service system and the user, the third-party service system can serve as the withholding requester to initiate the withholding request based on the blockchain. For example, the third-party service system can publish its own withholding information for the target account (i.e., the user's account) to the blockchain for certificate storage. Based on the publishing of the withholding request to the blockchain, the payment system can monitor the withholding request whose certificate has been stored on the blockchain by using a timed task. For example, the blockchain is monitored with a period of 2 s, and when it is detected that a new withholding request is published to a new block for certificate storage, the block is pulled to obtain the new withholding request whose certificate has been stored.

Step 604: Construct a withholding transaction based on the withholding information in response to the withholding request.

In the present implementation, after detecting the withholding request, the payment system can first perform some necessary service verification. For example, whether the withholding requester is in a normal working state can be verified, whether the payment service of the withholding requester is available can be verified, and so on. Then, the withholding transaction is constructed based on the withholding information included in the withholding request to invoke the smart contract to verify whether the withholding information complies with the withholding rule for the target account between the payment system and the withholding requester.

Step 606: Send the withholding transaction to a blockchain node, so that the blockchain node responds to the withholding transaction and invokes verification logic declared in a smart contract published on the blockchain, to verify whether the withholding information complies with a withholding rule for the target account between the payment system and the withholding requester.

Step 608: Obtain a verification result for the withholding information, and if the verification succeeds, perform deduction processing on the target account based on the withholding information.

In the present implementation, when the verification result for the withholding information obtained by the payment system indicates that the verification succeeds, the payment system has the right to take the place of the withholding requester to perform deduction processing for the user. Therefore, money can be deducted from the target account of the user to the designated account of the withholding requester based on the withholding information. The designated account can be specified by the third-party service system at the stage of signing the withholding agreement between the payment system and the third-party service system.

In the present implementation, when the verification result for the withholding information obtained by the payment system indicates that the verification succeeds, the payment system can generate a withholding document corresponding to the withholding request, and publish the withholding document to the blockchain for certificate storage. After the deduction succeeds, a withholding result can be published to the blockchain and associated with the withholding document for certificate storage, so that the withholding requester determines that payment of the target account succeeds after detecting the withholding result whose certificate has been stored on the blockchain. Further, the withholding requester can generate a write-off result (that is, write-off for the deduction result of the current withholding request) based on the determined payment success result, and associate the write-off result with the detected withholding result for certificate storage.

Figure 7:
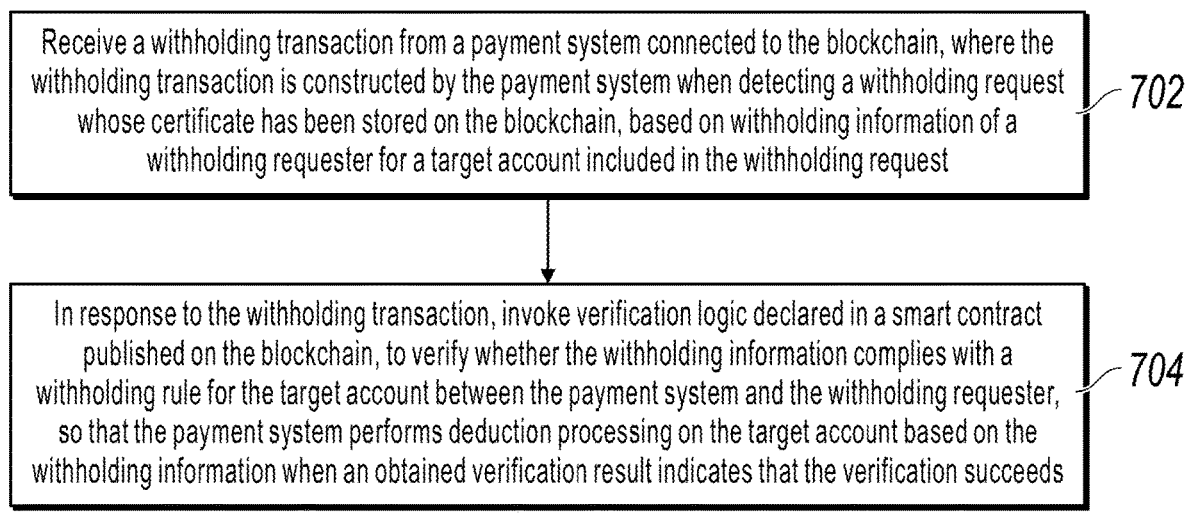
FIG. 7 is a flowchart illustrating another blockchain-based payment withholding method, according to an example implementation.

FIG. 7 is a flowchart illustrating a blockchain-based payment withholding method, according to an example implementation. As shown in FIG. 7, the method is applied to a blockchain node and can include the following steps:

Step 702: Receive a withholding transaction from a payment system connected to the blockchain, where the withholding transaction is constructed by the payment system when detecting a withholding request whose certificate has been stored on the blockchain, based on withholding information of a withholding requester for a target account included in the withholding request.

Step 704: In response to the withholding transaction, invoke verification logic declared in a smart contract published on the blockchain, to verify whether the withholding information complies with a withholding rule for the target account between the payment system and the withholding requester, so that the payment system performs deduction processing on the target account based on the withholding information when an obtained verification result indicates that the verification succeeds.

In the present implementation, based on the deployment of the first smart contract and the second smart contract on the blockchain, when the withholding information is verified, the criterion verification logic declared in the first smart contract published on the blockchain can be first invoked to determine whether the withholding information satisfies the withholding criterion set forth in the withholding agreement signed between the payment system and the withholding requester (i.e., the third-party service system). If yes, tripartite verification logic declared in a second smart contract published on the blockchain is further invoked to determine whether there is a tripartite agreement corresponding to the target account (corresponding to the user), where the tripartite agreement is used to indicate that the target account authorizes the payment system to provide a payment withholding service for a payment order for the target account, and the payment order is a payment order of the withholding requester for the target account.

It is worthwhile to note that, a type of the request initiated on the blockchain by the user accessing the blockchain can be a transaction used in the conventional blockchain. For example, the user accessing the blockchain can initiate a transaction used for signing a tripartite agreement in the blockchain (i.e., an agreement signing transaction), to invoke a smart contract published on the blockchain to verify the signing information of the tripartite agreement. Certainly, the type of the request initiated on the blockchain by the user accessing the blockchain can also be another form, such as an instruction, a message, etc. having a standard data structure other than a transaction. It is not specially limited in one or more implementations of the present specification. The following implementations are described by using an example in which the request initiated on the blockchain by the user accessing the blockchain is a transaction.

As can be seen from the previous technical solutions, according to the payment withholding and agreement signing solution in the present specification, the tripartite agreement is signed among the user, the third-party service system, and the payment system based on the blockchain. By signing the tripartite agreement, the user can authorize the payment system to take the place of the third-party service system to deduct money for the user. On the one hand, the created tripartite agreement is published to the blockchain for certificate storage, so that signing information of the tripartite agreement is traceable, anti-counterfeiting, and tamper-resistant. On the other hand, by invoking the smart contract to verify the withholding agreement signed between the payment system and the third-party service system before the tripartite agreement is signed, the authorization operation of the user can be performed under the precondition that the payment system is capable of replacing the third-party service system to perform deduction.

Further, based on the signed tripartite agreement, when there is a payment order between the third-party service system and the user, the third-party service system can publish a withholding request on the blockchain for certificate storage. After detecting the withholding request, the payment system can construct a withholding transaction to invoke a smart contract to verify whether the withholding is legal based on the previous withholding agreement and tripartite agreement. Then, when the withholding is legal, the payment system performs deduction processing for the user, so as to implement the payment withholding service.

For ease of understanding, the following describes in detail the withholding and agreement signing solution and the payment withholding solution in the present specification with reference to interactive diagrams.

Figure 8:
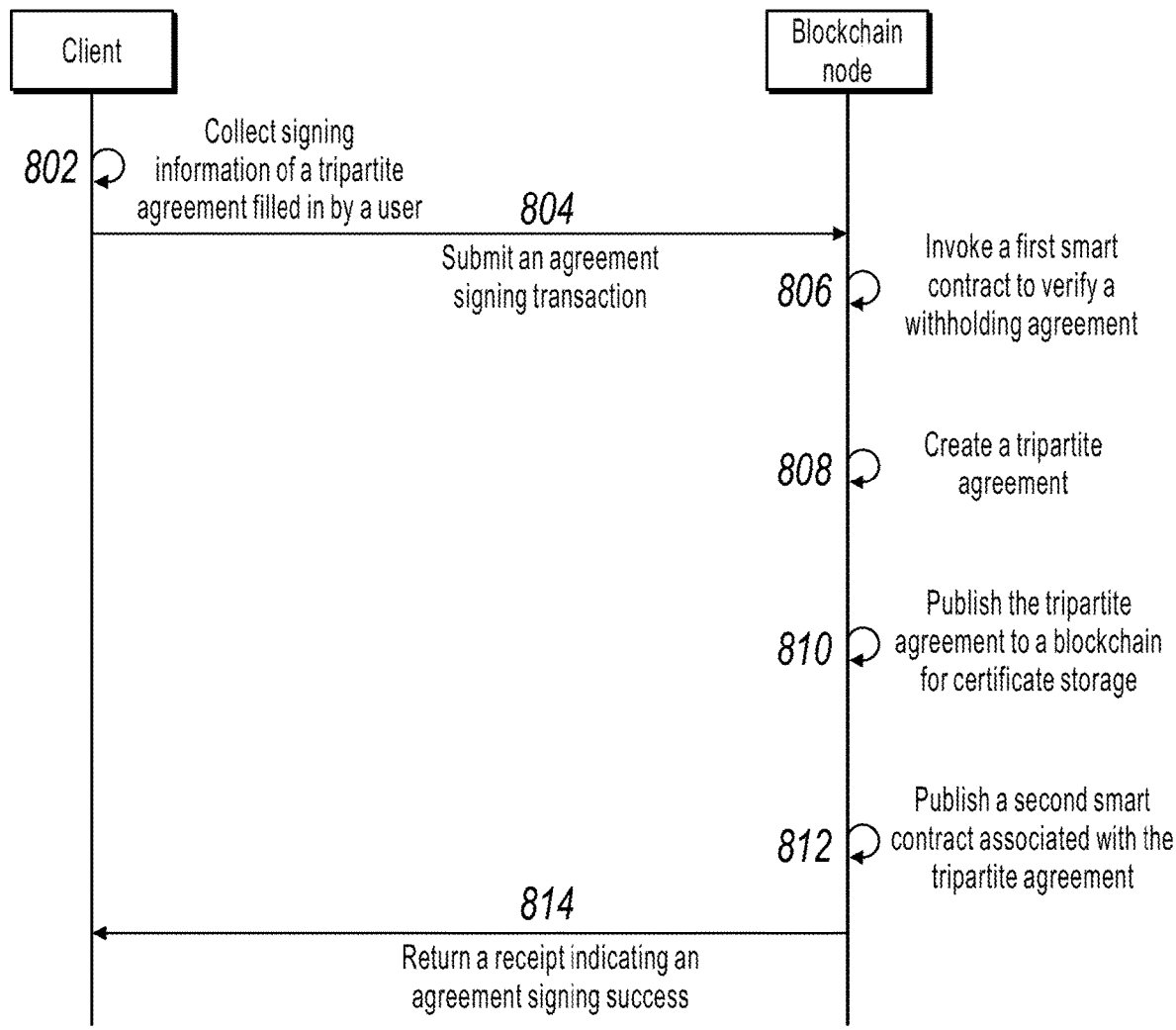
FIG. 8 is an interactive diagram illustrating a blockchain-based payment withholding method, according to an example implementation.

FIG. 8 is an interactive diagram illustrating a blockchain-based payment withholding method, according to an example implementation. As shown in FIG. 8, the interaction process can include the following steps:

Step 802: A client collects signing information of a tripartite agreement filled in by a user.

In the present implementation, the user can initiate agreement signing at an agreement signing page portal that is provided by an ISV, or by another client connected to a blockchain node. The user fills in the signing information of the tripartite agreement on the agreement signing page, including a service type, an account number, an account name, effective time, etc. After collecting the signing information of the tripartite agreement filled in by the user, the ISV (or another client) packages the signing information into an agreement signing transaction and sends the agreement signing transaction to the blockchain node to complete the agreement signing. For example, the agreement signing transaction can take the form of <HASH_ID1, SIGN>, where HASH_ID1 represents the hash value of the withholding agreement signed between the payment system and the third-party service system, SIGN represents the signing information of the tripartite agreement, and the signing information of the tripartite agreement is signed by using a private key of the user. The ISV (or another client) packages the agreement signing transaction and then sends the agreement signing transaction to the blockchain node, indicating that the user authorizes the payment system to provide the payment withholding service for the payment order for the user.

Step 804: The client submits the agreement signing transaction to the blockchain node.

Step 806: The blockchain node invokes a first smart contract to verify the withholding agreement.

In the present implementation, the withholding agreement can be formulated in advance between the payment system and the third-party service system. For example, both parties can negotiate offline about specific content of the withholding agreement: a designated account of the third-party service system, a limitation on a withholding amount range, a limitation on withholding times, a limitation on a withholding initiating time, etc. After negotiation about the withholding agreement is complete, the payment system or the third-party service system can publish the withholding agreement to the blockchain for certificate storage, and deploy the first smart contract associated with the withholding agreement on the blockchain. In a case, the withholding agreement can be stored in a block. In another case, the withholding agreement can be stored in account space of the first smart contract.

Based on the withholding agreement whose certificate has been stored, the first smart contract can declare withholding verification logic that is used to check whether there is the withholding agreement signed between the payment system and the third-party service system on the blockchain. Then, after receiving the agreement signing transaction, the blockchain node can invoke the withholding verification logic declared in the first smart contract, to check whether a withholding agreement corresponding to a hash value recorded in the agreement signing transaction is published on the blockchain for certificate storage.

The status of the withholding agreement can be further maintained for the withholding agreement signed between the payment system and the third-party service system. The withholding agreement can include an effective state, a to-be-effective state, an ineffective state, etc. Whether the withholding agreement is published on the blockchain for certificate storage is checked first, and if yes, whether the withholding agreement is valid is further checked. For example, whether the withholding agreement is valid can be determined based on the effective time described in the withholding agreement.

For example, assume that the effective time described in the withholding agreement is Jan. 1, 2019 to Dec. 31, 2019, and the time for certificate storage of the withholding agreement is Dec. 1, 2018. Within the time period from Dec. 1, 2018 to Dec. 31, 2018, the withholding agreement is in a to-be-effective state. Within the time period from Jan. 1, 2019 to Dec. 31, 2019, the withholding agreement is in an effective state. At a time later than Dec. 31, 2019, the withholding agreement is in an ineffective state.

Further, the third-party service system (or the payment system) can also declare the previous withholding criterion in the first smart contract in the form of criterion verification logic (that is, the criterion verification logic is used to verify whether the withholding information submitted by the third-party service system satisfies the withholding criterion set forth in the withholding agreement). The payment system (or the third-party service system) can predetermine a contract template for creating the first smart contract (for example, publish the contract template to the blockchain for certificate storage). The contract template records generic logic that is used to check whether the withholding information satisfies the withholding criterion. For example, the determining logic for checking whether the withholding information satisfies the limitation on the withholding amount range, the limitation on withholding times, and the limitation on the withholding initiating time is written in advance. Specific parameters (e.g., an amount parameter, a quantity parameter, and a time parameter) are represented by using a generic field. Then, when the first smart contract needs to be published, the generic logic is directly cited to fill the generic field with the specific parameter values. It is worthwhile to note that, the process of performing verification by using the criterion verification logic is described in detail in the following.

Step 808: The blockchain node creates a tripartite agreement.

Step 810: The blockchain node publishes the tripartite agreement to the blockchain for certificate storage.

Step 812: The blockchain node publishes the second smart contract associated with the tripartite agreement.

In a case, the tripartite agreement can be stored in a block. In another case, the tripartite agreement can be stored in account space of the second smart contract. The second smart contract declares tripartite verification logic that is used to verify the tripartite agreement corresponding to the user. For example, the payment system (or the third-party service system) can predetermine a contract template for creating the second smart contract (for example, publish the contract template to the blockchain for certificate storage). The contract template records generic logic that is used to verify the tripartite agreement. Then, when a smart contract is created by using the contract template, the hash value of the created tripartite agreement can be filled in the generic logic. The filled generic logic that includes the hash value is the tripartite verification logic that is used to verify the tripartite agreement corresponding to the hash value.

Similarly, the status of the tripartite agreement can also be maintained. For example, after the tripartite agreement is created, the tripartite agreement can be marked as the effective state based on the effective time described in the tripartite agreement. When the tripartite agreement of the user needs to be verified later, whether there is the tripartite agreement corresponding to the user can be verified first. If yes, whether the tripartite agreement is in an effective state is further verified.

Step 814: The blockchain node returns a receipt indicating an agreement signing success to the client.

In the present implementation, the user can also modify the signed tripartite agreement, for example, modify account information such as the user's account name and account number. The user can package a modification transaction (including modification information of the tripartite agreement for the user) by using the ISV or another client connected to the blockchain node, and send the modification transaction to the blockchain node. Then, after receiving the modification transaction, the blockchain node responds to the modification transaction, creates an updated tripartite agreement based on the modification information, creates a third smart contract (which declares tripartite verification logic that is used to verify the updated tripartite agreement corresponding to the user) associated with the updated tripartite agreement, and publishes the third smart contract to the blockchain. The process of modifying the tripartite agreement is similar to the previously described agreement signing process, and details are omitted here for simplicity.

In the present implementation, the user can also cancel the signed tripartite agreement, for example, modify the tripartite agreement (signed by the user) currently in an effective state as an ineffective state. The user can package an agreement cancellation transaction (including agreement cancellation information of the tripartite agreement for the user) by using the ISV or another client connected to the blockchain node, and send the agreement cancellation transaction to the blockchain node. Then, after receiving the agreement cancellation transaction submitted by the user, the blockchain node marks the tripartite agreement corresponding to the user as the ineffective state in response to the agreement cancellation transaction.

Figure 9:
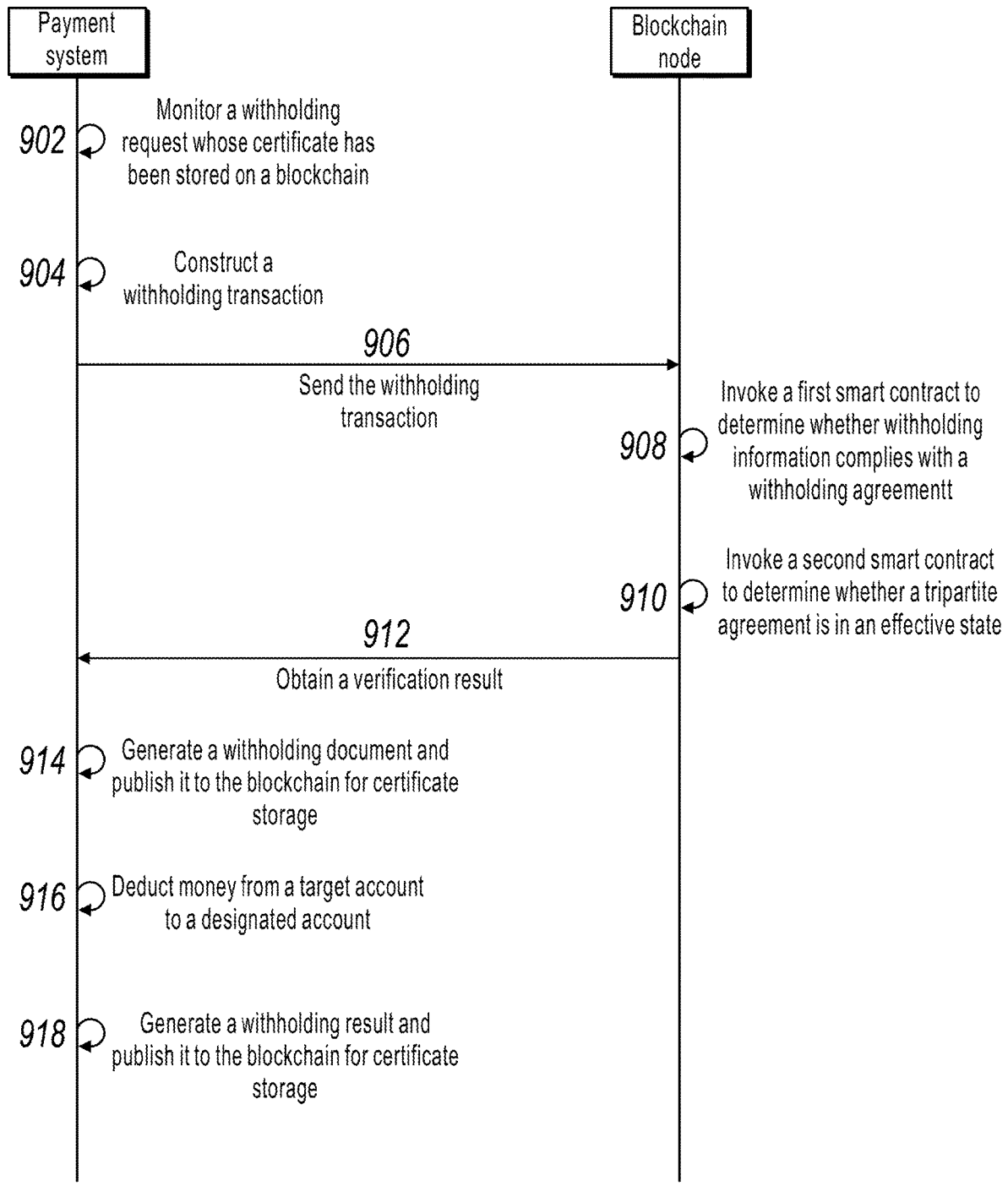
FIG. 9 is an interactive diagram illustrating a blockchain-based payment withholding method, according to an example implementation.

Based on the signed tripartite agreement, when the payment order is generated for the user in the third-party service system with which the tripartite agreement is signed, the payment system can provide the payment withholding service for the payment order for the user, that is, can take the place of the third-party service system to perform deduction processing for the payment order for the user. FIG. 9 is an interactive diagram illustrating a blockchain-based payment withholding method, according to an example implementation. As shown in FIG. 9, the interaction process can include the following steps:

Step 902: A payment system monitors a withholding request whose certificate has been stored on the blockchain.

In the present implementation, when the payment order is generated between the third-party service system and the user, the third-party service system can serve as the withholding requester to initiate the withholding request based on the blockchain. For example, the third-party service system can publish its own withholding information for the target account (i.e., the user's account) to the blockchain for certificate storage. The withholding information can include the user's account number, account name, account period, amount, bill validity time, etc. For example, the withholding request takes the form of <HASH_ID1, Deduct_Request>, where HASH_ID1 represents the hash value of the withholding request, and is obtained by performing hash calculation on the withholding information Deduct_Request.

Based on the publishing of the withholding request to the blockchain, the payment system can monitor the withholding request whose certificate has been stored on the blockchain by using a timed task. For example, the blockchain is monitored with a period of 2 s, and when it is detected that a new withholding request is published to a new block for certificate storage, the block is pulled to obtain the new withholding request whose certificate has been stored.

Step 904: The payment system constructs a withholding transaction.

In the present implementation, after detecting the withholding request, the payment system can first perform some necessary service verification. For example, whether the withholding requester is in a normal working state can be verified, whether the payment service of the withholding requester is available can be verified, and so on. Then, a withholding transaction is packaged based on the withholding information included in the withholding request. The withholding transaction further includes contract addresses of the first smart contract and the second smart contract. After receiving the withholding transaction, the blockchain node can invoke the corresponding smart contract based on the contract address included in the withholding transaction, to execute related service logic.

Step 906: The payment system sends the withholding transaction to the blockchain node.

Step 908: The blockchain node invokes the first smart contract to determine whether the withholding information complies with the withholding agreement.

Step 910: The blockchain node invokes the second smart contract to determine whether the tripartite agreement is in an effective state.

In the present implementation, the blockchain node first invokes the criterion verification logic declared in the first smart contract, to determine whether the withholding information in the withholding transaction satisfies the withholding criterion set forth in the withholding agreement. If yes, the blockchain node further invokes the tripartite verification logic declared in the second smart contract, to determine whether there is a tripartite agreement corresponding to the target account and whether the tripartite agreement is in an effective state.

Step 912: The payment system obtains a verification result.

In the present implementation, Ethereum is used as an example. The event mechanism of Ethereum can be used to implement the interaction between the smart contract and the payment system. For example, after the verification result is obtained in the second smart contract, the corresponding verification success event can be generated. When detecting the verification success event, the payment system connected to the Ethereum can obtain the verification result based on the verification success event.

Step 914: The payment system generates a withholding document and publishes it to the blockchain for certificate storage.

Step 916: The payment system deducts money from the target account to the designated account.

Step 918: Generate a withholding result and publish it to the blockchain for certificate storage.

In the present implementation, when the verification result for the withholding information obtained by the payment system indicates that the verification succeeds, the payment system can generate a withholding document corresponding to the withholding request, and publish the withholding document to the blockchain for certificate storage. After the deduction succeeds, a withholding result can be published to the blockchain and associated with the withholding document for certificate storage, so that the withholding requester determines that payment of the target account succeeds after detecting the withholding result whose certificate has been stored on the blockchain. Further, the withholding requester can generate a write-off result (that is, write-off for the deduction result of the current withholding request) based on the determined payment success result, and associate the write-off result with the detected withholding result for certificate storage.

For example, hash calculation can be performed on the withholding document, and the calculated hash value is recorded in the withholding result as an index of the withholding document. Similarly, hash calculation can be performed on the withholding result, and the calculated hash value is recorded in the write-off result as an index of the withholding result. By using the previously described association and certificate storage method, a linked list for withholding can be formed, thereby improving efficiency of each node device on the blockchain to view the whole withholding process. For example, the ISV can monitor the deduction result and publish it to a new block for certificate storage (or be notified by the payment system), and obtain the complete process of the current withholding based on the linked list for daily operations, transaction fees commission rebate settlement, etc.

Figure 10:
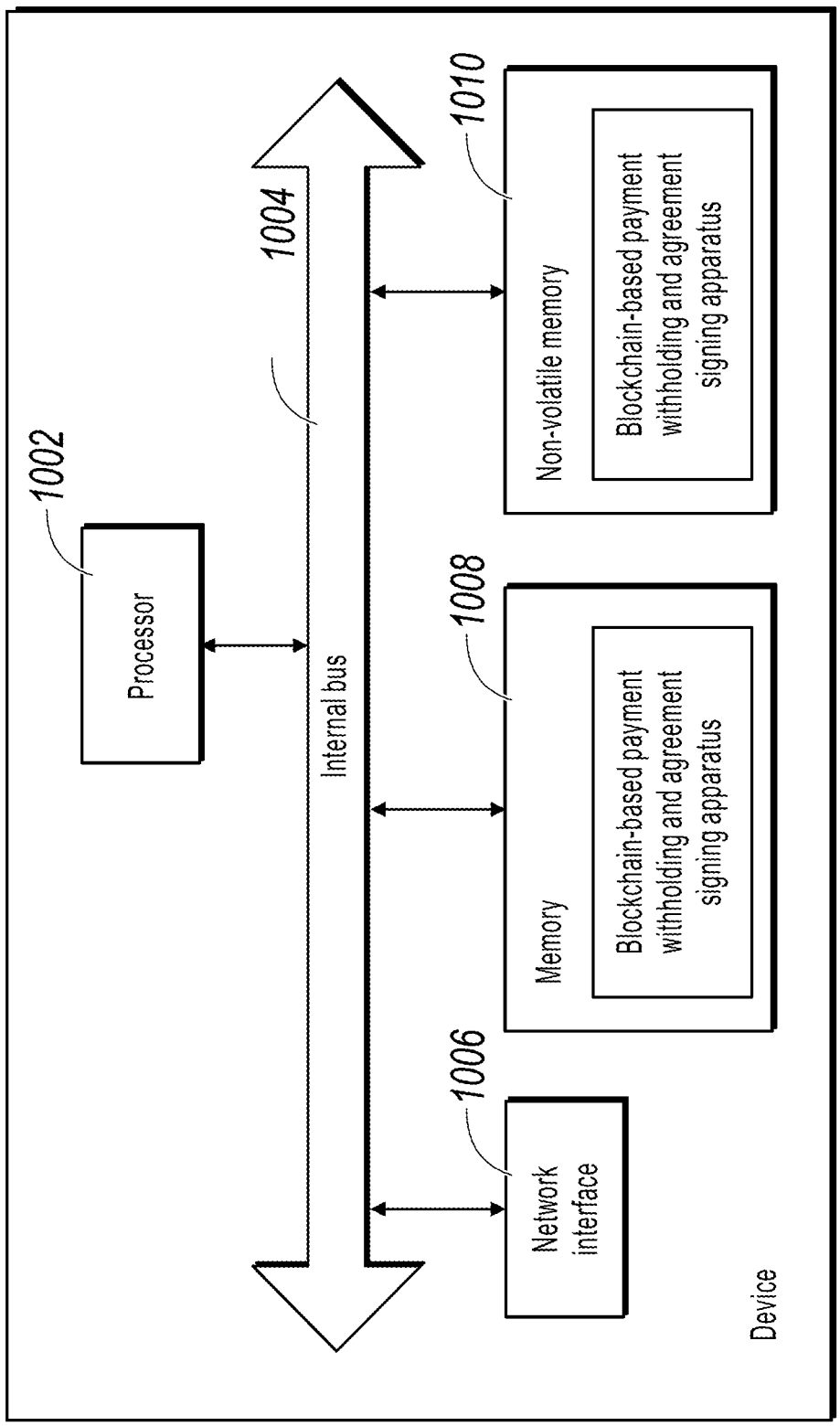
FIG. 10 is a schematic structural diagram illustrating a device, according to an example implementation.

FIG. 10 is a schematic structural diagram illustrating a device, according to an example implementation. References are made to FIG. 10. At the hardware level, the device includes a processor 1002, an internal bus 1004, a network interface 1006, a storage 1008, and a non-volatile memory 1010, and certainly can further include other hardware needed by a service. The processor 1002 reads a corresponding computer program from the non-volatile memory 1010 to the storage 1008 and then runs the computer program to form a blockchain-based payment withholding and agreement signing apparatus at the logic level. Certainly, in addition to software implementations, one or more implementations of the present specification do not preclude other implementations, such as a logic device or a combination of software and hardware. In other words, an execution body of the following processing procedure is not limited to each logical unit, and can be hardware or a logic device.

Figure 11:
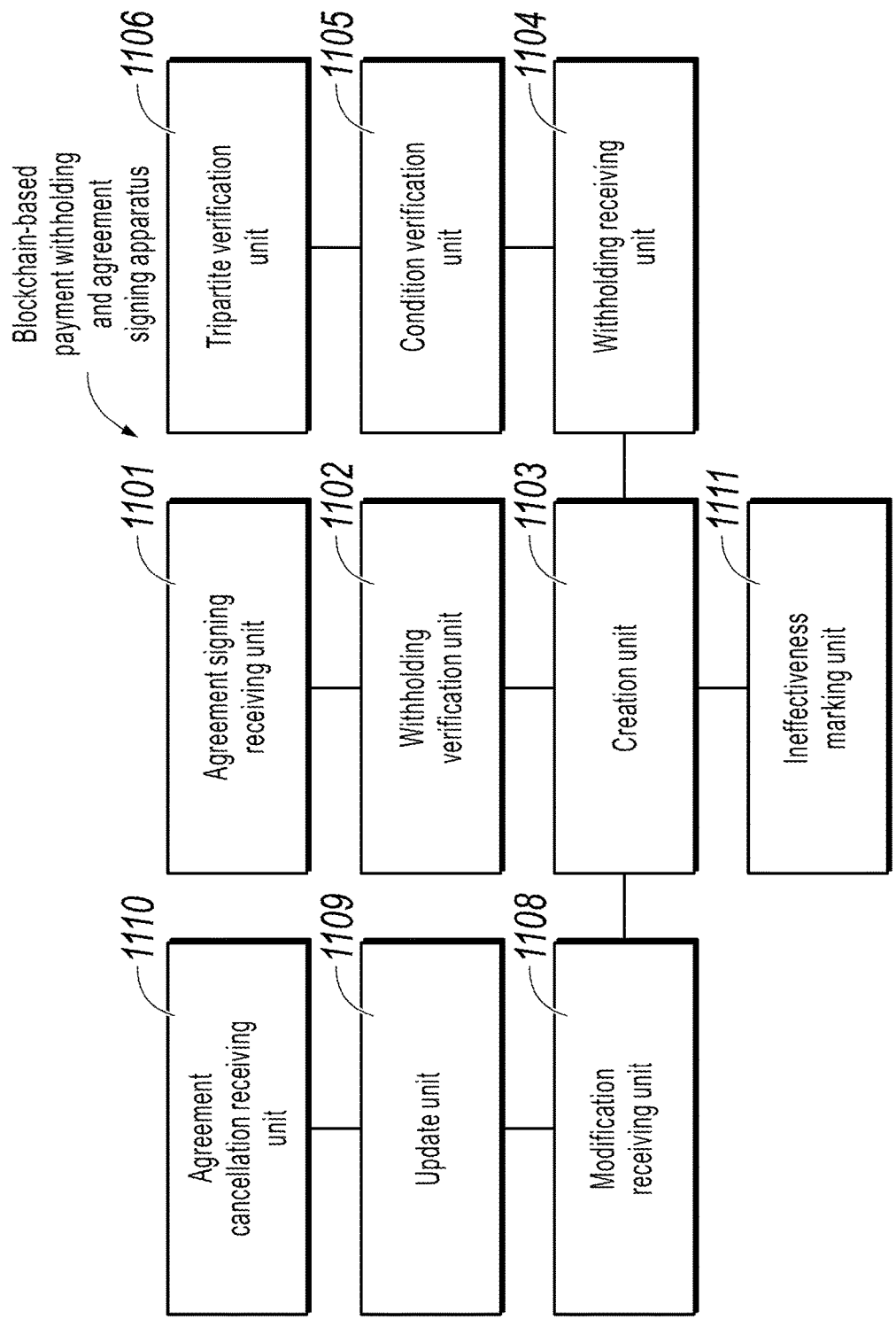
FIG. 11 is a block diagram illustrating a blockchain-based payment withholding and agreement signing apparatus, according to an example implementation.

References are made to FIG. 11. In a software implementation, the blockchain-based payment withholding and agreement signing apparatus can include the following: an agreement signing receiving unit 1101, configured to receive an agreement signing transaction submitted by a user, where the agreement signing transaction is used to authorize a payment system to provide a payment withholding service for the user for a payment order, the payment order is a payment order of the user in a third-party service system, and the agreement signing transaction includes agreement signing information of a tripartite agreement submitted by the user; a withholding verification unit 1102, configured to: in response to the agreement signing transaction, invoke withholding verification logic declared in a first smart contract published on the blockchain, to check whether there is a withholding agreement signed between the payment system and the third-party service system on the blockchain; and a creation unit 1103, configured to: if there is a withholding agreement signed between the payment system and the third-party service system on the blockchain, create, based on the signing information of the tripartite agreement, the tripartite agreement that authorizes the payment system to provide the payment withholding service for the payment order for the user, and publish the tripartite agreement to the blockchain for certificate storage.

Optionally, the withholding verification unit 1102 is configured to: check whether there is the withholding agreement on the blockchain; and if yes, further check whether the withholding agreement is valid.

Optionally, the creation unit 1103 is configured to: create the tripartite agreement based on the signing information of the tripartite agreement; publish the tripartite agreement to the blockchain for certificate storage; and create a second smart contract associated with the tripartite agreement and publish the second smart contract to the blockchain, where the second smart contract declares tripartite verification logic that is used to verify the tripartite agreement corresponding to the user.

Optionally, the apparatus further includes the following: a withholding receiving unit 1104, configured to receive a withholding transaction from the payment system connected to the blockchain, where the withholding transaction includes withholding information of the user's payment order in the third-party service system; a condition verification unit 1105, configured to: in response to the withholding transaction, invoke criterion verification logic declared in the first smart contract, to verify whether the withholding information satisfies a withholding criterion set forth in the withholding agreement; and a tripartite verification unit 1106, configured to: if the withholding information satisfies the withholding criterion set forth in the withholding agreement, further invoke the tripartite verification logic declared in the second smart contract, to check whether there is the tripartite agreement corresponding to the user, so that the payment system performs deduction processing for the user based on the withholding information when an obtained verification result indicates that the verification succeeds.

Optionally, the apparatus further includes the following: an effectiveness marking unit, configured to mark the tripartite agreement as an effective state based on an effective time described in the tripartite agreement after the tripartite agreement is created; and the tripartite verification unit 1106 is configured to: check whether there is the tripartite agreement; and if yes, further check whether the tripartite agreement is in the effective state.

Optionally, the apparatus further includes the following: a modification receiving unit 1108, configured to receive a modification transaction submitted by the user, where the modification transaction includes modification information for the tripartite agreement corresponding to the user; and an update unit 1109, configured to: create an updated tripartite agreement based on the modification information in response to the modification transaction, create a third smart contract associated with the updated tripartite agreement, and publish the third smart contract to the blockchain, where the third smart contract declares tripartite verification logic that is used to verify the updated tripartite agreement corresponding to the user.

Optionally, the apparatus further includes the following: an agreement cancellation receiving unit 1110, configured to receive an agreement cancellation transaction submitted by the user, where the agreement cancellation transaction includes agreement cancellation information for the tripartite agreement corresponding to the user; and an ineffectiveness marking unit 1111, configured to mark the tripartite agreement corresponding to the user as an ineffective state in response to the agreement cancellation transaction.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are previously described. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for blockchain-based payment withholding and agreement signing, comprising:
publishing, by a blockchain node in a blockchain, a withholding agreement document of a payment system connected to the blockchain and a third-party service system to the blockchain, wherein the withholding agreement document comprises a withholding criterion defining a withholding parameter relative to a range;

hashing, by the blockchain node, the withholding agreement document to generate a hash value;

generating, using a predetermined contract template, tripartite verification logic, wherein the predetermined contract template records generic logic used to verify the withholding agreement document, and wherein the tripartite verification logic is generated when the hash value is filled in the generic logic;

creating, by the blockchain node, a first smart contract associated with the withholding agreement document and publishing the first smart contract to the blockchain, wherein the first smart contract comprises a declaration of the tripartite verification logic and criterion verification logic;

receiving, by the blockchain node and from a user, an agreement signing transaction, wherein the agreement signing transaction comprises signing information of a tripartite agreement;

identifying, by the blockchain node, the withholding agreement document of the payment system and the third-party service system on the blockchain, by invoking the tripartite verification logic declared in the first smart contract published on the blockchain;

creating, by the blockchain node, based on the signing information of the tripartite agreement, the tripartite agreement, wherein the tripartite agreement is associated with an authorization of a payment withholding service for the user for a payment order, and publishing, by the blockchain node, the tripartite agreement to the blockchain;

receiving, by the blockchain node, a withholding transaction from the payment system connected to the blockchain, wherein the withholding transaction comprises withholding information of the payment order for the user in the third-party service system;

determining, by the blockchain node, that the withholding information satisfies the withholding criterion in the withholding agreement document by using the tripartite verification logic;

in response to determining that the withholding information satisfies the withholding criterion, determining, by the blockchain node, that the tripartite agreement is published to the blockchain and that the tripartite agreement corresponds to the hash value;

in response to determining that the tripartite agreement is published to the blockchain and that the tripartite agreement corresponds to the hash value, generating, by the blockchain node, a verification success result, wherein the verification success result is associated with the authorization of the payment withholding service for the user for the payment order; and recording, by the blockchain node, the hash value in the verification success result.

2. The computer-implemented method of claim 1, wherein identifying the withholding agreement document of the payment system and the third-party service system on the blockchain comprises:

determining that the withholding agreement document is stored on the blockchain; and determining that the withholding agreement document is valid.

3. The computer-implemented method of claim 1, wherein creating, based on the signing information of the tripartite agreement, the tripartite agreement, and the publishing the tripartite agreement to the blockchain comprises:

creating the tripartite agreement based on the signing information of the tripartite agreement;

publishing the tripartite agreement to the blockchain; and creating a second smart contract associated with the tripartite agreement and publishing the second smart contract to the blockchain, wherein the second smart contract comprises the tripartite verification logic associated with verification of the tripartite agreement corresponding to the user.

4. The computer-implemented method of claim 3, wherein determining that the withholding information satisfies the withholding criterion in the withholding agreement document comprises verifying that the withholding information satisfies the withholding criterion in the withholding agreement document by invoking the criterion verification logic in the first smart contract; and wherein determining that the tripartite agreement is published to the blockchain and that the tripartite agreement corresponds to the user comprises identifying the tripartite agreement corresponding to the user on the blockchain by invoking the tripartite verification logic in the second smart contract.

5. The computer-implemented method of claim 4, further comprising:

maintaining status of the tripartite agreement based on an effective time described in the tripartite agreement after the tripartite agreement is created, wherein the status of the tripartite agreement comprises a first state and a second state; and identifying the tripartite agreement corresponding to the user on the blockchain by invoking the tripartite verification logic associated with the second smart contract comprises: identifying the tripartite agreement; and determining that the tripartite agreement is in the first state.

6. The computer-implemented method of claim 3, further comprising:

receiving, from the user, a modification transaction, wherein the modification transaction comprises modification information for the tripartite agreement corresponding to the user;

creating an updated tripartite agreement based on the modification information;

creating a third smart contract associated with the updated tripartite agreement; and publishing the third smart contract to the blockchain, wherein the third smart contract comprises a second tripartite verification logic associated with verification of the updated tripartite agreement corresponding to the user.

7. The computer-implemented method of claim 1, further comprising:

receiving, from the user, an agreement cancellation transaction, wherein the agreement cancellation transaction comprises agreement cancellation information for the tripartite agreement corresponding to the user; and marking the tripartite agreement corresponding to the user as being in second state.

8. A non-transitory, computer-readable medium storing one or more instructions executable by a computer system to perform one or more operations for blockchain-based payment withholding and agreement signing, the operations comprising:

publishing, by a blockchain node in a blockchain, a withholding agreement document of a payment system connected to the blockchain and a third-party service system to the blockchain, wherein the withholding agreement document comprises a withholding criterion defining a withholding parameter relative to a range;

hashing, by the blockchain node, the withholding agreement document to generate a hash value;

generating, using a predetermined contract template, tripartite verification logic, wherein the predetermined contract template records generic logic used to verify the withholding agreement document, and wherein the tripartite verification logic is generated when the hash value is filled in the generic logic;

creating, by the blockchain node, a first smart contract associated with the withholding agreement document and publishing the first smart contract to the blockchain, wherein the first smart contract comprises a declaration of the tripartite verification logic and criterion verification logic;

receiving, by the blockchain node and from a user, an agreement signing transaction, wherein the agreement signing transaction comprises signing information of a tripartite agreement;

identifying, by the blockchain node, the withholding agreement document of the payment system and the third-party service system on the blockchain, by invoking the tripartite verification logic declared in the first smart contract published on the blockchain;

creating, by the blockchain node, based on the signing information of the tripartite agreement, the tripartite agreement, wherein the tripartite agreement is associated with an authorization of a payment withholding service for the user for a payment order, and publishing, by the blockchain node, the tripartite agreement to the blockchain;

receiving, by the blockchain node, a withholding transaction from the payment system connected to the blockchain, wherein the withholding transaction comprises withholding information of the payment order for the user in the third-party service system;

determining, by the blockchain node, that the withholding information satisfies the withholding criterion in the withholding agreement document by using the tripartite verification logic;

in response to determining that the withholding information satisfies the withholding criterion, determining, by the blockchain node, that the tripartite agreement is published to the blockchain and that the tripartite agreement corresponds to the hash value;

in response to determining that the tripartite agreement is published to the blockchain and that the tripartite agreement corresponds to the hash value, generating, by the blockchain node, a verification success result, wherein the verification success result is associated with the authorization of the payment withholding service for the user for the payment order; and recording, by the blockchain node, the hash value in the verification success result.

9. The non-transitory, computer-readable medium of claim 8, wherein identifying the withholding agreement document between the payment system and the third-party service system on the blockchain comprises:
determining that the withholding agreement document is stored on the blockchain; and
determining that the withholding agreement document is valid.

10. The non-transitory, computer-readable medium of claim 8, wherein creating, based on the signing information of the tripartite agreement, the tripartite agreement, and the publishing the tripartite agreement to the blockchain comprises:
creating the tripartite agreement based on the signing information of the tripartite agreement;
publishing the tripartite agreement to the blockchain; and
creating a second smart contract associated with the tripartite agreement and publishing the second smart contract to the blockchain, wherein the second smart contract comprises tripartite verification logic associated with verification of the tripartite agreement corresponding to the user.

11. The non-transitory, computer-readable medium of claim 10, wherein determining that the withholding information satisfies the withholding criterion in the withholding agreement document comprises verifying that the withholding information satisfies the withholding criterion in the withholding agreement document by invoking the criterion verification logic in the first smart contract; and wherein determining that the tripartite agreement is published to the blockchain and that the tripartite agreement corresponds to the user comprises identifying the tripartite agreement corresponding to the user on the blockchain by invoking the tripartite verification logic in the second smart contract.

12. The non-transitory, computer-readable medium of claim 11, wherein the one or more operations further comprise:
maintaining status of the tripartite agreement based on an effective time described in the tripartite agreement after the tripartite agreement is created, wherein the status of the tripartite agreement comprises a first state and a second state; and
identifying the tripartite agreement corresponding to the user on the blockchain by invoking the tripartite verification logic associated with the second smart contract comprises: identifying the tripartite agreement; and determining that the tripartite agreement is in the first state.

13. The non-transitory, computer-readable medium of claim 10, wherein the one or more operations further comprise:
receiving, from the user, a modification transaction, wherein the modification transaction comprises modification information for the tripartite agreement corresponding to the user;
creating an updated tripartite agreement based on the modification information;
creating a third smart contract associated with the updated tripartite agreement; and
publishing the third smart contract to the blockchain, wherein the third smart contract comprises a second tripartite verification logic associated with verification of the updated tripartite agreement corresponding to the user.

14. The non-transitory, computer-readable medium of claim 8, wherein the one or more operations further comprise:
receiving, from the user, an agreement cancellation transaction, wherein the agreement cancellation transaction comprises agreement cancellation information for the tripartite agreement corresponding to the user; and
marking the tripartite agreement corresponding to the user as being in a second state.

15. A computer-implemented system for blockchain-based payment withholding and agreement signing, the computer-implemented system comprising:
one or more computers; and one or more computer memory devices interoperably coupled with the one or more computers and having tangible, non-transitory, machine-readable media storing one or more instructions that, when executed by the one or more computers, perform one or more operations comprising:
publishing, by a blockchain node in a blockchain, a withholding agreement document of a payment system connected to the blockchain and a third-party service system to the blockchain, wherein the withholding agreement document comprises a withholding criterion defining a withholding parameter relative to a range;
hashing, by the blockchain node, the withholding agreement document to generate a hash value;
generating, using a predetermined contract template, tripartite verification logic, wherein the predetermined contract template records generic logic used to verify the withholding agreement document, and wherein the tripartite verification logic is generated when the hash value is filled in the generic logic;
creating, by the blockchain node, a first smart contract associated with the withholding agreement document and publishing the first smart contract to the blockchain, wherein the first smart contract comprises a declaration of the tripartite verification logic and criterion verification logic;
receiving, by the blockchain node and from a user, an agreement signing transaction, wherein the agreement signing transaction comprises signing information of a tripartite agreement;
identifying, by the blockchain node, the withholding agreement document of the payment system and the third-party service system on the blockchain, by invoking the tripartite verification logic declared in the first smart contract published on the blockchain;
creating, by the blockchain node, based on the signing information of the tripartite agreement, the tripartite agreement, wherein the tripartite agreement is associated with an authorization of a payment withholding service for the user for a payment order, and publishing, by the blockchain node, the tripartite agreement to the blockchain;
receiving, by the blockchain node, a withholding transaction from the payment system connected to the blockchain, wherein the withholding transaction comprises withholding information of the payment order for the user in the third-party service system;
determining, by the blockchain node, that the withholding information satisfies the withholding criterion in the withholding agreement document by using the tripartite verification logic;
in response to determining that the withholding information satisfies the withholding criterion, determining, by the blockchain node, that the tripartite agreement is published to the blockchain and that the tripartite agreement corresponds to the hash value;
in response to determining that the tripartite agreement is published to the blockchain and that the tripartite agreement corresponds to the hash value, generating, by the blockchain node, a verification success result, wherein the verification success result is associated with the authorization of the payment withholding service for the user for the payment order; and
recording, by the blockchain node, the hash value in the verification success result.

16. The computer-implemented system of claim 15, wherein identifying the withholding agreement document between the payment system and the third-party service system on the blockchain comprises:
determining that the withholding agreement document is stored on the blockchain; and
determining that the withholding agreement document is valid.

17. The computer-implemented system of claim 15, wherein creating, based on the signing information of the tripartite agreement, the tripartite agreement, and the publishing the tripartite agreement to the blockchain comprises:
creating the tripartite agreement based on the signing information of the tripartite agreement;
publishing the tripartite agreement to the blockchain; and
creating a second smart contract associated with the tripartite agreement and publishing the second smart contract to the blockchain, wherein the second smart contract comprises tripartite verification logic associated with verification of the tripartite agreement corresponding to the user.

18. The computer-implemented system of claim 17, wherein determining that the withholding information satisfies the withholding criterion in the withholding agreement document comprises verifying that the withholding information satisfies the withholding criterion in the withholding agreement document by invoking the criterion verification logic in the first smart contract, and wherein determining that the tripartite agreement is published to the blockchain and that the tripartite agreement corresponds to the user comprises identifying the tripartite agreement corresponding to the user on the blockchain by invoking the tripartite verification logic in the second smart contract.

19. The computer-implemented system of claim 17, wherein the operations further comprise:
receiving, from the user, a modification transaction, wherein the modification transaction comprises modification information for the tripartite agreement corresponding to the user;
creating an updated tripartite agreement based on the modification information;
creating a third smart contract associated with the updated tripartite agreement; and
publishing the third smart contract to the blockchain, wherein the third smart contract comprises a second tripartite verification logic associated with verification of the updated tripartite agreement corresponding to the user.

20. The computer-implemented system of claim 15, wherein the operations further comprise:
receiving, from the user, an agreement cancellation transaction wherein the agreement cancellation transaction comprises agreement cancellation information for the tripartite agreement corresponding to the user; and
marking the tripartite agreement corresponding to the user as being in a second state.

* * * * *